United States Patent
Hawley

(10) Patent No.: US 10,882,510 B2
(45) Date of Patent: Jan. 5, 2021

(54) ENGINE AUTOSTOP CONTROL

(71) Applicant: Toyota Motor Engineering & Manufacturing North America, Inc., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 269 days.

(21) Appl. No.: 15/874,824

(22) Filed: Jan. 18, 2018

(65) Prior Publication Data

US 2019/0217847 A1    Jul. 18, 2019

(51) Int. Cl.
| | |
|---|---|
| *B60W 20/10* | (2016.01) |
| *B60W 30/18* | (2012.01) |
| *B60W 40/13* | (2012.01) |
| *B60W 40/10* | (2012.01) |
| *B60L 7/18* | (2006.01) |
| *B60L 15/20* | (2006.01) |
| *B60L 7/26* | (2006.01) |

(52) U.S. Cl.
CPC .............. *B60W 20/10* (2013.01); *B60L 7/18* (2013.01); *B60L 7/26* (2013.01); *B60L 15/2009* (2013.01); *B60W 30/18109* (2013.01); *B60W 40/10* (2013.01); *B60W 40/13* (2013.01); *B60L 2200/28* (2013.01); *B60L 2240/12* (2013.01); *B60L 2240/642* (2013.01); *B60L 2250/18* (2013.01); *B60L 2260/50* (2013.01); *B60W 2510/182* (2013.01); *B60W 2520/105* (2013.01); *B60W 2530/10* (2013.01); *B60W 2540/12* (2013.01); *B60W 2710/06* (2013.01); *B60W 2710/18* (2013.01)

(58) Field of Classification Search
None
See application file for complete search history.

(56) References Cited

U.S. PATENT DOCUMENTS

| | | | |
|---|---|---|---|
| 9,014,940 B2 | 4/2015 | Newman | |
| 2013/0035839 A1 | 2/2013 | Otanez | |
| 2013/0296102 A1* | 11/2013 | Banker | ............... B60W 10/196 477/4 |
| 2013/0297161 A1* | 11/2013 | Gibson | ................. B60W 20/00 701/54 |
| 2014/0116793 A1* | 5/2014 | Pelletier | ................. B60K 6/485 180/65.225 |
| 2015/0105213 A1 | 4/2015 | Wright | |
| 2015/0134162 A1 | 5/2015 | Yamazaki | |
| 2019/0039596 A1* | 2/2019 | Hawley | ............... B60L 15/2018 |

* cited by examiner

*Primary Examiner* — Peter D Nolan
*Assistant Examiner* — Demetra R Smith-Stewart
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for determining an optimal point during operation of a hybrid electric vehicle towing a trailer at which the energy that can be recouped through regenerative braking is maximized. Operating conditions or characteristics of the hybrid electric vehicle and the brake characteristics of the trailer are considered in determining the optimal point at which the energy that can be recouped is maximized. At the optimal point at which the energy that can be recouped is maximized, the engine of the hybrid electric vehicle is turned off. Otherwise, the engine of the hybrid electric vehicle is left on.

18 Claims, 13 Drawing Sheets

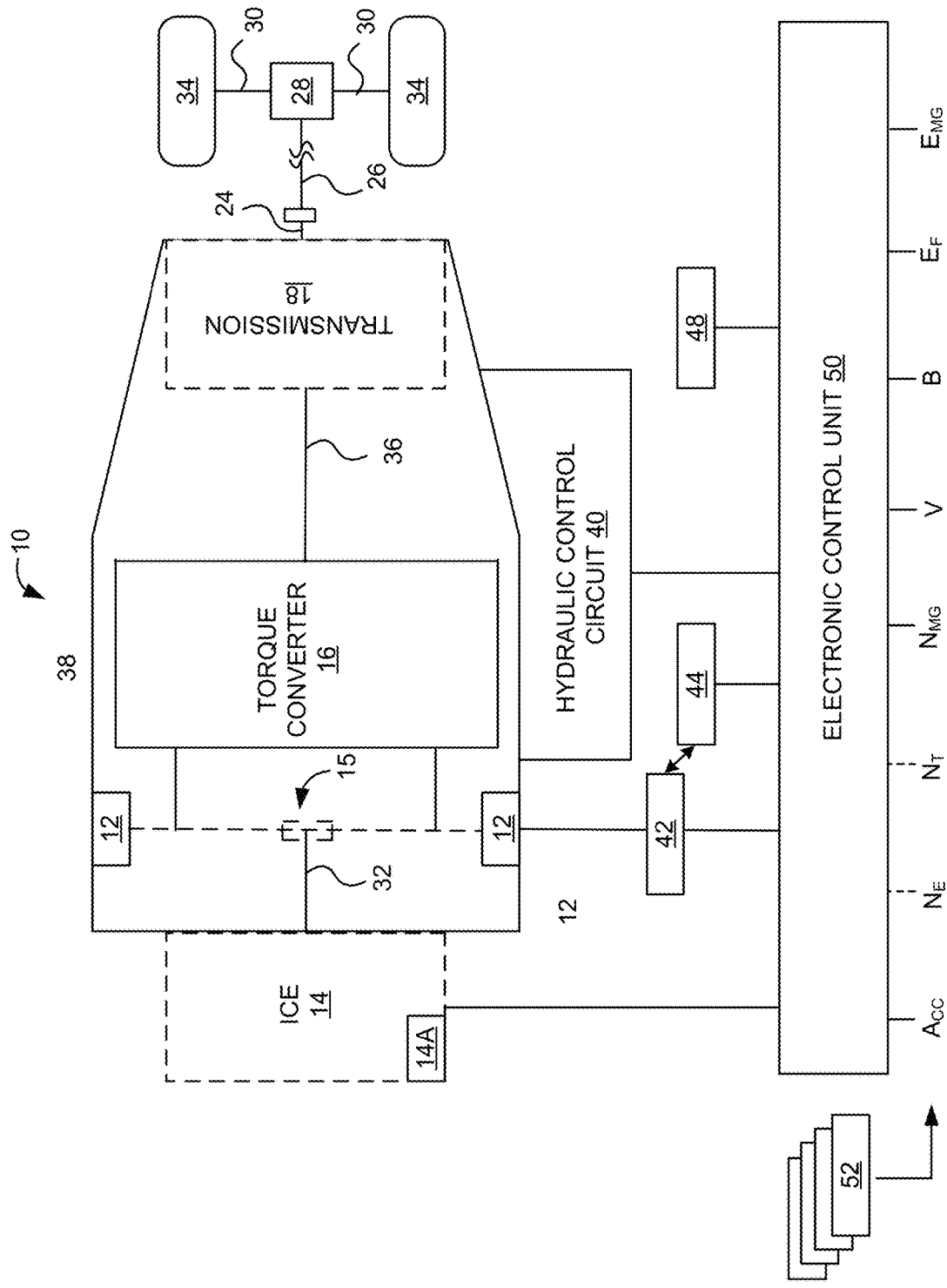

ENGINE AUTOSTOP CONTROL

TECHNICAL FIELD

The present disclosure relates generally to controlling engine operation in a hybrid electric vehicle (HEV). In some embodiments, enablement of the autostop feature in an HEV is inhibited based on a surplus of regenerative braking potential energy and lack of fuel economy benefits during a tow condition.

DESCRIPTION OF RELATED ART

Hybrid electric vehicles (HEVs) have become increasingly popular among drivers concerned with their environmental impact and with increasing fuel economy. HEVs generally utilize an internal combustion engine (ICE) in conjunction with an electric motor, also referred to as a motor generator (MG). HEVs can achieve better fuel economy over a conventional (ICE-only) vehicle because the need for fossil fuel, e.g., gasoline, is reduced. HEVs also help reduce the carbon footprint of an individual by lessening the creation of toxic byproducts normally generated when operating a conventional fossil-fuel-powered vehicle. An HEV's electric motor can be powered by a battery, which requires recharging. In HEVs, a controller can monitor a battery state of charge (SOC) and/or battery residual charge to determine when to recharge the battery, as well as determine when to switch from utilizing its ICE to utilizing its electric motor and vice versa. Some HEVs implement an engine autostop/autostart feature, wherein the engine of an HEV is automatically turned off under certain conditions, e.g., when the HEV is not moving, or when the HEV is traveling below some threshold vehicle speed. The engine of an HEV may also be automatically turned off when the power requirement for driving the HEV is or can be met solely by the MG, e.g., when only minimal acceleration is requested (small accelerator pedal condition).

In HEVs, engine braking can also be applied by operating the engine in a fuel-cut mode, where the engine is pumping without a supply of fuel. This results in friction that generates negative engine torque. Additionally, deceleration can be achieved by the MG such that it generates negative motor torque, i.e., regenerative braking. In particular, lifting off the throttle in an HEV results in the current driving the electric motor switching direction transitioning the MG from motor mode to generator mode. An inverter can be switched such that is draws power (from the negative motor torque) that can be used to recharge the HEV's battery. Moreover, an armature of the electric motor's rotor can be slowed by the force of inducing current in its windings as it passes over magnets in a stator creating friction that slows the HEV down.

BRIEF SUMMARY OF THE DISCLOSURE

In accordance with one embodiment, a method comprises calculating mass and road load of a vehicle and trailer being towed by the vehicle, and calculating force absorbed by brakes of the trailer. The method may further comprise generating a driver braking profile and determining anticipated deceleration given a vehicle speed based on the driver braking profile. Further still, the method may comprise calculating potential energy that can be recouped based on the anticipated deceleration relative to the calculated mass and road load of the vehicle and trailer and the force absorbed by the brakes of the trailer.

In some embodiments, the force absorbed by the brakes of the trailer is proportional to brake pressure applied by brakes of the vehicle. In some embodiments, generating the driver braking profile comprises monitoring a driver's braking events over a period of time to determine rates of deceleration due to braking at a plurality of vehicle speeds. In some embodiments, generating the driver braking profile further comprises determining an average rate of deceleration due to braking at each of the plurality of vehicle speeds.

The method may further comprise determining a current speed at which the vehicle is traveling, and determining a current requested brake force. Moreover, the method may further comprise determining a trailer brake gain based on the force absorbed by the brakes of the trailer, and determining a remaining capacity of a power storage device of the vehicle.

In some embodiments, the current speed at which the vehicle is traveling, the current requested brake force compensated by the trailer brake gain, and the remaining capacity of the power storage device of the vehicle is compared to the anticipated deceleration and potential energy that can be recouped based on the anticipated deceleration.

In some embodiments, the method further comprises determining a vehicle speed at which an engine of the vehicle is to be stopped. In some embodiments, the vehicle is a hybrid electric vehicle.

In some embodiments, the method may further comprise performing regenerative braking upon the vehicle teaching the vehicle speed at which the engine of the vehicle is to be stopped.

In accordance with another embodiment, a hybrid electric vehicle towing a trailer may comprise an internal combustion engine; an electric motor operatively connected in parallel to the internal combustion engine; and an electronic control unit. The electronic control unit may be adapted to control operation of the internal combustion engine in accordance with one or more control signals from an engine autostop control circuit. Thus, the electronic control unit can be instructed to turn the internal combustion engine off upon the hybrid electric vehicle reaching a threshold vehicle speed at which the electric motor can recoup all available energy through regenerative braking and the hybrid electric vehicle is decelerating.

In some embodiments, the electronic control unit is adapted to further control operation of the internal combustion engine in accordance with additional one or more control signals from the engine autostop control circuit. These signals can instruct the electronic control unit to keep the internal combustion engine on when the hybrid electric vehicle is traveling at a speed that surpasses the threshold vehicle speed.

In some embodiments, the engine autostop control circuit calculates potential available energy that can be recouped through regenerative braking. In some embodiments, the engine autostop control circuit calculates the potential available energy that can be recouped based on force absorbed by brakes of the trailer during deceleration of the hybrid electric vehicle.

In some embodiments, the engine autostop control circuit calculates the potential available energy that can be recouped based additionally on mass and road load of the hybrid electric vehicle and the trailer. In some embodiments, the engine autostop control circuit calculates the potential available energy that can be recouped based additionally on an anticipated deceleration due to braking by a driver of the hybrid electric vehicle.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1A is a schematic representation of an HEV in which engine autostop control can be implemented in accordance with various embodiments of the present disclosure.

Figure 1B:
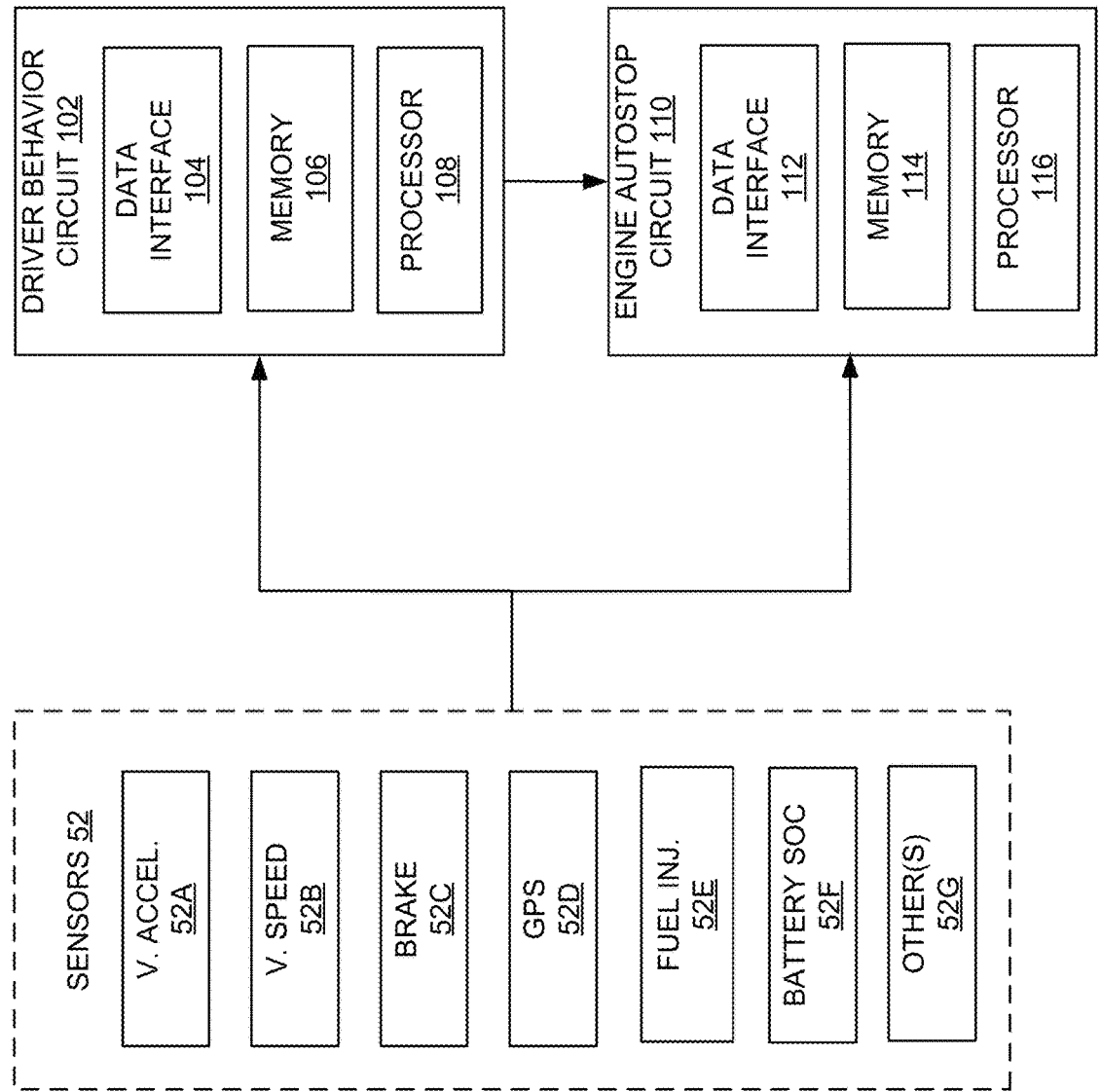
FIG. 1B is a functional block diagram illustrating component parts of an engine autostop control system in the HEV of FIG. 1A.

The figures are not exhaustive and do not limit the present disclosure to the precise form disclosed.

DETAILED DESCRIPTION

Depending on certain factors, energy that can be recaptured by an HEV (while towing a load, such as a trailer) through regenerative braking varies. Those factors may include vehicle speed, mass and road load of a vehicle towing the trailer, battery state of charge (SOC), vehicle and trailer brake characteristics, and driving characteristics of a driver. For example, under certain conditions, e.g., when a vehicle is traveling at higher speeds and its mass along with that of a trailer is high, energy loss due the engine being in fuel cut mode cannot be recaptured. Additionally, the benefits of recapturing energy can be outweighed by the startup energy required to reach the necessary drive force to propel the vehicle and its trailer depending on the above factors. Further still, the point at which all the available energy can begin to be recaptured may depend on how aggressively the driver brakes the HEV in order to decelerate the HEV.

In those cases when it would not be beneficial to turn the vehicle's engine off, the engine should be left on, i.e., the engine should only be turned off when all the available energy can be recaptured. Accordingly, various embodiments of the present disclosure are directed to determining when a vehicle's engine should be turned off to maximize the energy recouped through regenerative braking, and inhibiting the vehicle's engine autostop mode when energy cannot be recouped. In this way, fuel economy can be increased without sacrificing driveability.

In some embodiments, an engine autostop circuit can be configured to calculate a vehicle's mass and road load as well as calculate an estimate of a trailer's brake force. Moreover, the engine autostop circuit may receive information reflecting the driving characteristics of a driver operating the vehicle. Further still, the engine autostop circuit can receive, in real-time, current operating characteristics of the vehicle and trailer reflecting the above-noted factors, i.e., vehicle speed, applicable vehicle and trailer brake force, and battery SOC. The engine autostop circuit can consider these factors as a function of the vehicle's mass and road load, trailer brake force, and driving characteristics. The engine autostop circuit can determine an optimal vehicle speed at which the engine should be stopped to maximize the energy recouped through regenerative braking. The engine autostop circuit can also communicate with the vehicle's electronic control unit and instruct the electronic control unit to turn the vehicle's engine off when that optimal vehicle speed is reached. Otherwise, the engine autostop circuit can prevent the vehicle's engine from being turned off/keep the vehicle's engine on.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

An example HEV in which engine autostop control may be implemented is illustrated in FIG. 1A. FIG. 1A illustrates a drive system of a vehicle 10 that may include an internal combustion engine 14 and one or more electric motors 12 as sources of motive power. Driving force generated by the internal combustion engine 14 and MG 12 can be transmitted to one or more wheels 34 via a torque converter 16, a transmission 18, a differential gear device 28, and a pair of axles 30.

As an HEV, vehicle 10 may be driven/powered with either or both of engine 14 and the motor(s) 12 as the drive source for travel. For example, a first travel mode may be an engine-only travel mode that only uses ICE 14 as the drive source for travel. A second travel mode may be an EV travel mode that only uses the MG(s) 12 as the drive source for travel. A third travel mode may be an HEV travel mode that uses engine 14 and the MG(s) 12 as drive sources for travel. In the engine-only and HEV travel modes, vehicle 10 relies on the motive force generated at least by ICE 14, and a clutch 15 may be included to engage engine 14. In the EV travel mode, vehicle 10 is powered by the motive force generated by MG 12 while engine 14 may be stopped and clutch 15 disengaged.

Engine 14 can be an internal combustion engine such as a gasoline, diesel or similarly powered engine in which fuel is injected into and combusted in a combustion chamber. An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

MG 12 can also be used to provide motive power in vehicle 10, and is powered electrically via a power storage device 44. MG 12 can be powered by power storage device 44 to generate a motive force to move the vehicle and adjust vehicle speed. MG 12 can also function as a generator to generate electrical power such as, for example, when coasting or braking. Power storage device 44 may also be used to power other electrical or electronic systems in the vehicle. MG 12 may be connected to power storage device 44 via an inverter 42. Power storage device 44 can include, for example, one or more batteries, capacitive storage units, or other storage reservoirs suitable for storing electrical energy that can be used to power MG 12. When power storage device 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to MG 12, and adjust the current received from MG 12 during regenerative coasting and breaking. As a more particular example, output torque of the MG 12 can be increased or decreased by electronic control unit 50 through the inverter 42.

A torque converter 16 can be included to control the application of power from engine 14 and MG 12 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the MG 12 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1A, electronic control unit 50 receives information from a plurality of sensors included in vehicle 10. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of ICE 14 (engine RPM), a rotational speed, $N_{MG}$, of the MG 12 (motor rotational speed), and vehicle speed, $N_V$. These may also include torque converter 16 output, $N_T$ (e.g., output amps indicative of motor output), brake operation amount/pressure, B, battery SOC (i.e., the charged amount for power storage device 44 detected by an SOC sensor). Accordingly, vehicle 10 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (ICE 14+MG 12) efficiency, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

FIG. 1B is a functional block diagram illustrating component parts of an engine autostop control system that can be included in electronic control unit 50. In some embodiments, the engine autostop control system can be implemented separately from electronic control unit 50, wherein output control signals can be communicated to the electronic control unit 50. The engine autostop control system may include a driver behavior circuit 102 and an engine autostop circuit 110 operatively connected to one or more sensors 52. The one or more sensors 52 may comprise a vehicle acceleration sensor 52A, a vehicle speed sensor 52B, a brake operation/pressure sensor 52C, a GPS sensor 52D, a fuel injection sensor 52E, a battery SOC sensor 52F, and/or other sensors 52G. Although sensors 52 are depicted as communicating with driver behavior circuit 102 and engine autostop circuit 110, they can also communicate with each other as well as with other vehicle systems.

Sensors 52A-G may be example embodiments of sensors 52 illustrated in FIG. 1A. Sensors 52A-G can include one or more of the above-mentioned sensors and/or other sensors capable of sensing vehicle operating conditions that may be used to decide whether or not to allow engine 14 of vehicle 10 to be stopped or to keep engine 14 running (e.g., inhibit vehicle 10's autostop feature, discussed below). It should be understood that not all the illustrated sensors are necessarily needed, and that additional sensors (other sensor(s) 52G) may be used.

For example, battery SOC information from battery SOC sensor 52F can be obtained and used to determine how much energy can be recouped through regenerative braking. That is, power storage device 44, when implemented using one or more batteries, has a limit to the amount of energy it can store. Accordingly, performing regenerative braking when the battery SOC is full or high does not provide any benefit as power storage device 44 cannot absorb the energy recouped through regenerative braking. In fact, power storage device 44 can be harmed by overcharging in some cases.

For example, as will be discussed below, brake sensor 52C can sense the brake operation or pressure requested by the driver of vehicle 10. This can be used to determine the driver's braking profile, which in turn, may be used in determining an optimal point to implement the engine autostop feature. Moreover, the requested brake operation or pressured requested by the driver of vehicle 10 can be determined by brake sensor 52C and used to gauge how braking should be performed. For example, when the requested brake pressure is "light," electronic control unit 50 may apply MG-only negative torque, whereas electronic control unit 50 may apply blended or friction-only braking when the requested brake pressure is higher (or when the battery SOC is high).

In some embodiments, other sensors may be used to provide data that can be used in a calculation or comparison operation to determine whether or not the engine autostop feature should be inhibited or allowed to stop engine 14. For example, a vehicle speed sensor 52B may be configured to determine the speed at which vehicle 10 is traveling. In some embodiments, vehicle speed sensor 52B may be a sensor configured to determine the number of revolutions one or more wheels (e.g., wheels 34) are turning over some period of time. This number of revolutions may be translated into vehicle speed through one or more known calculations that may be performed on vehicle speed sensor 52B or that may be performed by processor 108. In some embodiments, vehicle speed sensor 52B may be a radar, sonar, or other device that uses, e.g., the Doppler effect, to determine the speed at which vehicle 10 is traveling. For example, a radar may be used to transmit a beam to a roadside object, such as a traffic sign, and the speed of vehicle 10 can be determined based upon the change in frequency of the beam upon bouncing back from the roadside object. Vehicle speed may be used as a factor in judging the optimal point at which to enable engine autostop.

In some embodiments, the driving characteristics associated with a driver, in particular, the driver's braking characteristics, can be monitored and used to generate a driver braking profile. This driver braking profile, as alluded to above, can be used as at least one factor in determining an optimal point to stop engine 14 during operation of vehicle 10 in order to maximize the energy recouped through regenerative braking. Driver behavior circuit 102 may include a data interface 104, a memory 106, and a processor 108. Components of driver behavior circuit 102 may communicate with each other via a data bus, although other communication in interfaces can be included.

Processor 108 may be a GPU, CPU, microprocessor, or any other suitable processing system. The memory 106 may include one or more various forms of memory or data storage (e.g., flash, RAM, etc.) that may be used to store the calibration parameters, images (analysis or historic), point parameters, instructions and variables for processor 108 as well as any other suitable information. Memory 106 can be made up of one or more modules of one or more different types of memory, and may be configured to store data and other information as well as operational instructions that may be used by the processor 108 to control driver behavior circuit 102.

Although the example of FIG. 1B is illustrated using processor and memory circuitry, as described below with reference to circuits disclosed herein, driver behavior circuit 102 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a driver behavior circuit.

Data interface 104 can be either a wireless communications/processing interface or a wired communications/processing interface with an associated hardwired data port (not illustrated). As this example illustrates, communications with driver behavior circuit 102 can include either or both wired and wireless communications. A wireless data interface can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise.

A wired data interface can include a transmitter and a receiver (not shown) for hardwired communications with other devices, e.g., a hardwired interface to other components, including sensors 52A-G and engine autostop circuit 110. A wired data interface can communicate with other devices using Ethernet or any of a number of other wired communication protocols whether standardized, proprietary, open, point-to-point, networked or otherwise.

Data interface 104 can be used to transmit and receive data between driver behavior circuit 102 and sensors 52A-G, as well as between driver behavior circuit 102 and engine autostop circuit 110. For example, data interface 104 can be configured to receive data and other information from, e.g., vehicle acceleration sensor 52A. This sensor data can be used to determine the rate of acceleration (or deceleration) vehicle 10 may be experiencing. Data interface 104 may further receive information that directly or indirectly reflects vehicle 10's operating efficiency, e.g., battery SOC, fuel consumption, etc.

In operation, driver behavior circuit 102 may determine how a driver operates vehicle 10 with respect to braking. That is, vehicle deceleration data from vehicle acceleration sensor 52A can be obtained and compared to vehicle speed data from vehicle speed sensor 52B. Deceleration data and vehicle speed data may be monitored and gathered over time, such that driver behavior circuit 102 can determine an average deceleration rate for a given vehicle speed. This in turn, can be used to generate a driver braking profile.

The engine autostop control system further includes an engine autostop circuit 110 that can be configured to determine when engine 14 should be stopped in order to maximize the amount of energy recouped through regenerative braking. The determination can be based on sensor data/calculations (as previously described) and the driver braking profile. That is, the engine autostop circuit 110 can determine a predicted amount of energy available for recapture. This determination is based on the mass and road load information of the vehicle and trailer, along with the driver braking profile and calculated trailer brake information. The predicted amount of energy available for recapture can then be characterized as a function of the real-time data reflecting vehicle speed, requested brake pressure, trailer brake gain, and battery SOC to determine an optimal vehicle speed at which engine 14 can be stopped. Moreover, the engine autostop circuit can set or instruct the electronic control unit to inhibit the engine autostop feature at a vehicle speed beyond which energy cannot be recaptured/the amount of energy that can be recaptured is outweighed by the startup energy required.

Similar to driver behavior circuit 102, engine autostop circuit 110 may include a data interface 112, a memory 114, and a processor 116. The components of engine autostop circuit 110 may communicate with each other via a data bus, although other communication in interfaces can be included. Processor 108 may be a GPU, CPU, microprocessor, or any other suitable processing system. The memory 106 may include one or more various forms of memory or data storage (e.g., flash, RAM, etc.) that may be used to store information relevant to determining the optimal vehicle speed at which to enable engine autostop. Memory 106 can be made up of one or more modules of one or more different types of memory, and may be configured to store data and other information as well as operational instructions that may be used by the processor 116 to control engine autostop circuit 110.

Engine autostop circuit 110 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a driver behavior circuit. Data interface 112 can be either a wireless communications/processing interface or a wired communications/processing interface with an associated hardwired data port (not illustrated) similar to data interface 104.

Data interface 104 can be used to transmit and receive data between engine autostop circuit 110 and sensors 52A-G, as well as between engine autostop circuit 110 and driver behavior circuit 102. For example, data interface 112 can be configured to receive the driver braking profile information from driver behavior circuit 102, in addition to vehicle deceleration information from vehicle acceleration sensor 52A, vehicle speed information from vehicle speed sensor 52B, etc.

It should be noted that in some embodiments, although implemented as separate elements of the engine autostop control system, driver behavior circuit 102 and engine autostop circuit 110 may be implemented with the same data interface, memory, and processor.

More energy can be recouped through regenerative braking, i.e., more regenerative braking power is available, at higher speeds and higher mass. That is, at higher speeds, more deceleration power (negative acceleration) is needed to slow a vehicle down. Likewise, the heavier the mass of the vehicle (and in various embodiments, the trailer) is, the more deceleration power is needed to maintain the same rate of deceleration. This can be reflected with the below equation.

$$Force_{net} = mass * acceleration$$

However, when engine 14 is on, but in a fuel cut mode, for example, energy is absorbed from the road to keep the pistons of engine 14 moving in order to slow down vehicle 10. Although this aids in deceleration vehicle 10, this is not energy that can be recaptured through regenerative braking by MG 12. Moreover, at higher speeds, energy loss due to keeping engine 14 on is not detrimental to fuel economy because at these higher speeds, the energy that can be recouped is likely to be greater than the storage capacity of power storage device 44. Accordingly, as alluded to above, there are certain conditions under which energy loss during operation of vehicle 10 may not be recouped.

Figure 2:
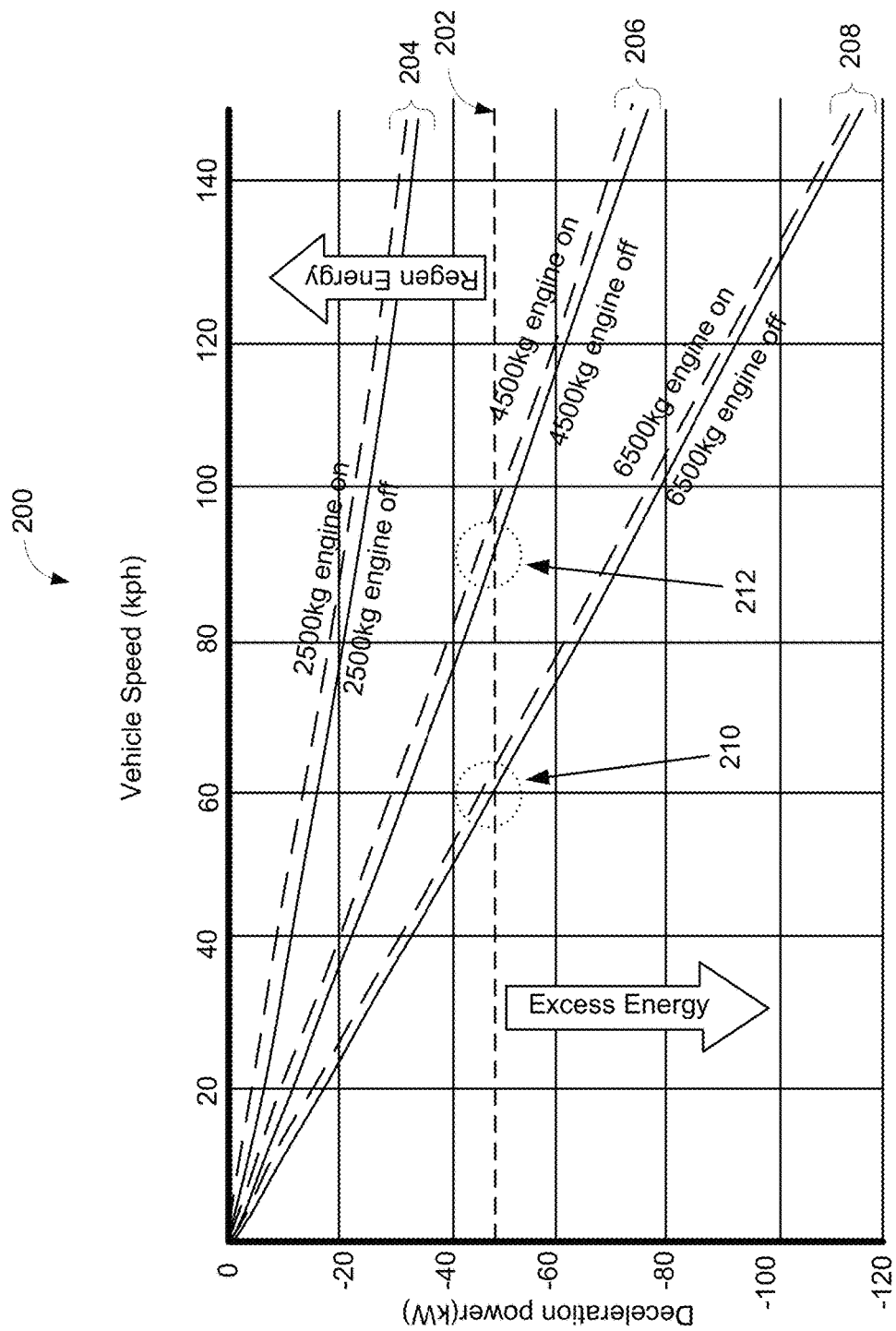
FIG. 2 is a graph illustrating example relationships between power needed to decelerate a vehicle in relation to vehicle speed and weight and regenerative braking potential.

FIG. 2 is a graph 200 illustrating example relationships between the power needed to decelerate a vehicle in relation to vehicle speed and weight and regenerative braking potential. That is, graph 200 shows the potential energy that can be recouped through regenerative braking for different masses (vehicle and trailer) at the same deceleration power, both with the engine on and with the engine off.

In particular, graph 200 illustrates a maximum deceleration power level 202 above which, energy can be recouped, and below which, energy is lost and cannot be recouped. It should be understood that because graph 200 illustrates deceleration power, energy levels "above" the maximum deceleration power level 202 refers to conditions where a hybrid system is able to decelerate at a desired/given rate. Energy levels "below" the maximum deceleration power level 202 refers to conditions that exceeds the maximum, i.e., require more deceleration power than the hybrid system is able to provide to decelerate at a desired/given rate. Graph 200 illustrates a first set of data 204 regarding a combined vehicle/trailer mass of 2500 kg and the amount of deceleration needed to slow the vehicle and trailer down at some given deceleration rate. Graph 200 illustrates a second set of data 206 regarding a combined vehicle/trailer mass of 2500 kg and the amount of deceleration needed to slow this second vehicle and trailer down at the same deceleration rate. Graph 200 illustrates a third set of data 208 regarding a combined vehicle/trailer mass of 2500 kg and the amount of deceleration needed to slow this third vehicle and trailer down at the same deceleration rate.

It can be appreciated that the heavier the mass of the vehicle and trailer, the slower they must be traveling to reach a point at which the amount of energy recouped through regenerative braking is maximized. For the second and third vehicle and trailer combinations, the respective points at which their respective engines can be stopped are at approximately 90 kph (212) and 60 kph (210). In other words, when the second vehicle and trailer (given their combined mass of 4500 kg) are traveling at 90 kph or less, energy can be recouped through regenerative braking and the second vehicle's engine can be turned off. At speeds higher than 90 kph, the mass/speed of the second vehicle and trailer generates too much energy to be recouped by the second vehicle's power storage device. Moreover, if the engine were to stop, the startup process uses energy from the power storage device, e.g., battery, to spin up the engine. This energy could exceed the energy benefit of stopping the engine). Moreover, there could be a time delay due to the startup process as well (e.g., the time needed to direct the desired driving power to the wheels) that could further lessen the driving experience.

It should be noted that these values and scenarios are merely exemplary and used to illustrate how mass and speed can ultimately impact deceleration power and the amount of energy that can be recouped.

Figure 3A:
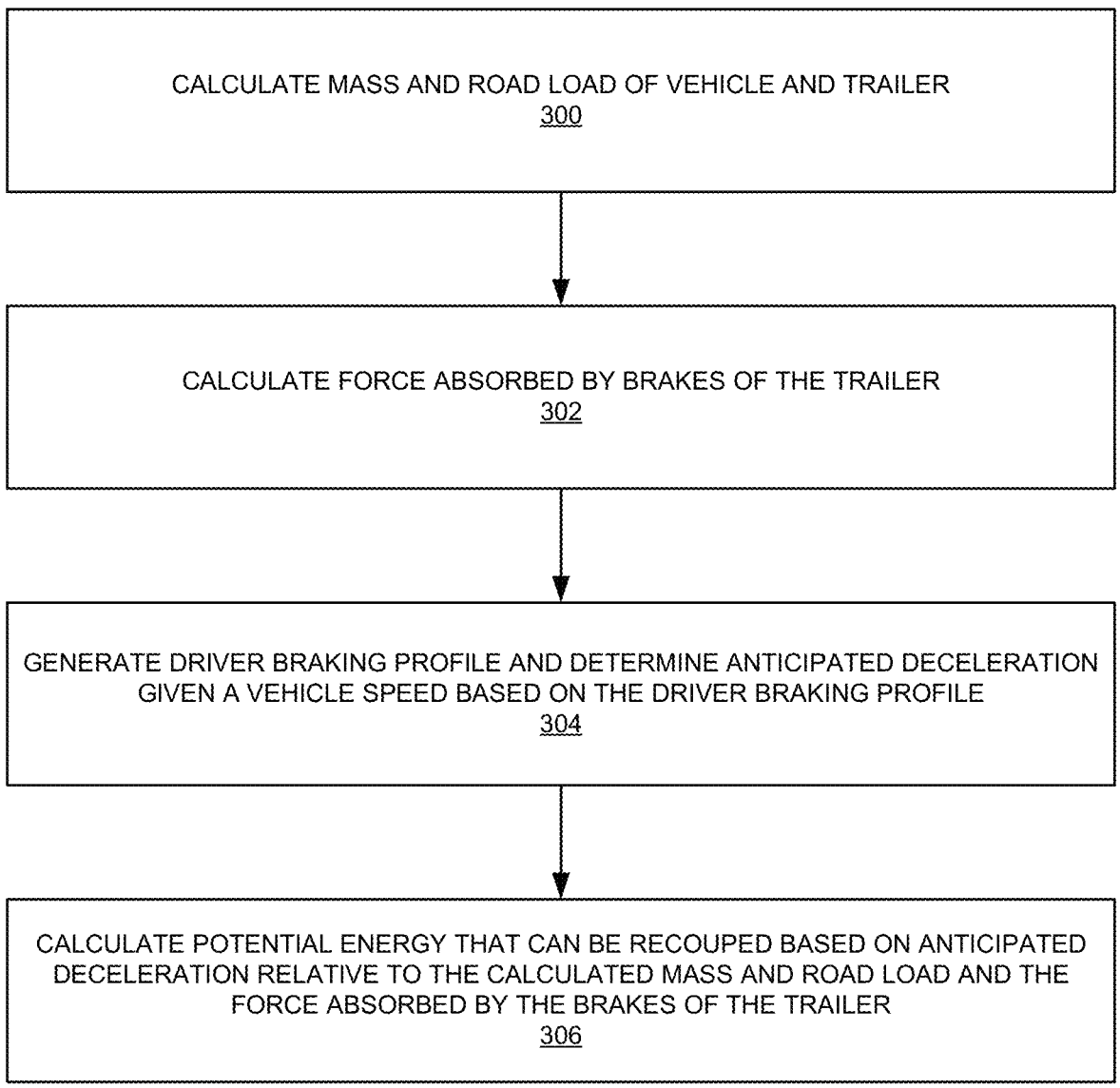
FIG. 3A is a flow chart illustrating example operations for calculating potential energy that can be recaptured through regenerative braking in accordance with one embodiment.

As previously noted, certain factors and conditions are taken into account when determining the optimal point at which an engine should be stopped to recoup energy. This may include the mass and road load of the vehicle and trailer, the force absorbed by the trailer brakes, and anticipated deceleration (based on the driver's braking profile). Based on this information, the potential energy available to be recouped through regenerative braking can be calculated at a given speed. FIG. 3A is a flow chart illustrating example operations for calculating potential energy that can be recaptured through regenerative braking in accordance with one embodiment.

At operation 300, the mass and road load of vehicle 10 and the trailer it is towing is calculated. There are various methods of calculating road load. In one embodiment, road load can be calculated while vehicle 10 is in an EV mode. For example, relevant mass of vehicle 10 is determined during a low speed condition while the vehicle is powered only by MG 12. In some embodiments, a low speed may be a speed less than approximately 18 mph/30 kph. Making a relevant vehicle mass determination can be done when a vehicle, e.g., vehicle 10 is traveling at lower speeds to negate variables that may skew the relevant vehicle mass determination when the vehicle is traveling at higher speeds. Moreover, the relevant vehicle mass determination can be performed while vehicle 10 is traveling on a relatively flat plane, although a correction factor may be applied based on road gradient information determined by a 3-axis accelerometer, e.g., an embodiment of one of sensors 52.

In some embodiments, the relevant mass of vehicle 10 and that of the towed trailer can be determined based on the drivetrain force, e.g., torque at wheels 34, and the acceleration being experienced by vehicle 10. Torque at wheels 34 can be determined by receiving one or more signals from one of sensors 52 capable of determining the torque at wheels 34. In some embodiments, torque at wheels 34 can be calculated by determining torque output by MG 12 and multiplying that output torque by a torque multiplication factor of torque converter 16 in a current gear in which automatic transmission 18 is operating. In some embodiments, drivetrain deceleration force can be determined from an electronically controlled brake (ECB) used to distribute force between regenerative braking and friction braking efforts. In some embodiments, the ECB relates a brake pedal request to a torque request at the wheels 34. This torque request may be met either through negative motor torque, through brake pressure being applied, or a combination of negative motor torque and brake pressure. It should be noted that this drivetrain deceleration force may be similar to drivetrain force because it is representative of the torque at the wheels. 34 Acceleration can be determined by vehicle acceleration sensor 52A.

The road load associated with vehicle 10 and the trailer is determined based upon the mass of vehicle 10, current acceleration or deceleration of vehicle 10, and a current drive force of vehicle 10. Road load can be determined while hybrid vehicle is traveling at relatively higher speeds in accordance with the following equation.

$$Force_{drivetrain} - Force_{road\_load} = mass * acceleration$$

Here, the force or resistance experienced by vehicle 10 can be calculated based on the previously calculated relevant mass of vehicle 10. That is, the drivetrain force can be calculated and acceleration can be determined as described above. Knowing the relevant mass of vehicle 10, the road load force can be determined. Road load can refer to the resistance experienced/force imparted by a vehicle while traveling at some constant speed over a level surface. The resistance can be attributed to various factors, including but not limited to, air resistance or drag, the resistance or friction of the wheels of the vehicle contacting the road, drivetrain losses, etc. A road load curve can be interpolated based upon the above calculations, so that at any speed or velocity, the road load associated with vehicle 10 can be determined. In some embodiments, road load is repeatedly calculated so as to build a road load profile that is more accurate, the more road load determinations are made. Road load can impact the target driving force in as much as it provides resistance that the target driving force must overcome and/or may add to negative target driving force.

At operation 302, the force absorbed by the trailer brakes is calculated. Net force can be represented by the following equation $$Force_{net} = [(T_{engine} + T_{motor}) * gear\_ratio * diff\_ratio / tire\_radius] + F_{vehicle\ brakes} + F_{trailer\ brakes}$$

Accordingly, the force absorbed by the trailer brakes can be calculated as follows.

$$F_{trailer\ brakes} = mass * acceleration - \{[(T_{engine} + T_{motor}) * gear\_ration * diff\_ratio / tire\_radius] + F_{vehicle\ brakes} + F_{road\ load}$$

Figure 3B:
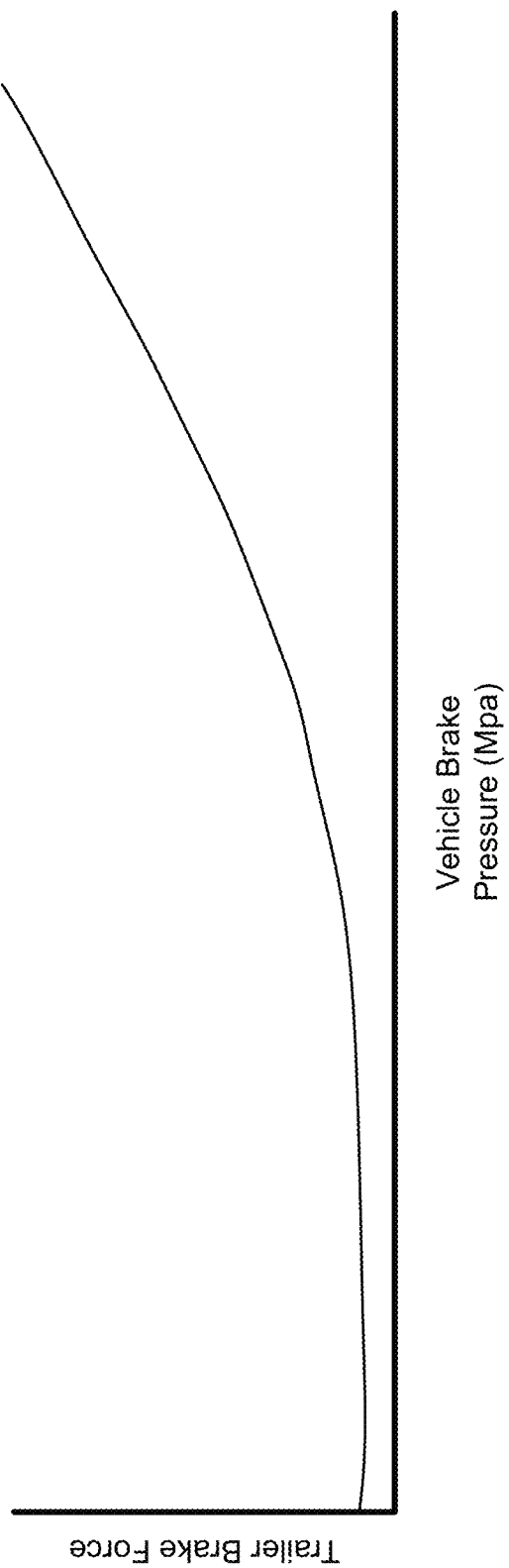
FIG. 3B is a graph illustrating an example relationship between trailer brake force and vehicle brake pressure.

It should be understood that in most circumstance, trailer brakes operate proportionally to the vehicle brakes. FIG. 3B illustrates this correlation between vehicle brake pressure and the force absorbed by the trailer brakes. This correlation between vehicle brake pressure and the force absorbed by the trailer brakes (also referred to as trailer brake force) represents a trailer brake gain for a given vehicle brake pressure. If the force absorbed by the trailer brakes is not taken into account, the resulting determinations described herein are not as accurate. That is, if trailer brake force is not taken into account, the resulting calculations will suggest that the vehicle brakes are providing a larger force than they actually are. Over-estimating the force provided by the vehicle brakes can result in the engine staying on longer because the ECB assumes a need for greater braking force than might actually be needed. For example, the engine autostop control circuit 110 may assume that based on an ECB brake request, there is a need for, e.g., 60 kW of braking force/deceleration power (FIG. 2) to be applied by the vehicle brakes. In actuality, however, because the trailer brakes absorb, e.g., 40 kW, the net force needed from the vehicle brakes is only 20 kW. If this is less than the maximum deceleration power level needed to decelerate the vehicle at a desired/given rate (i.e., below maximum deceleration power level 202 (FIG. 2)), the engine should be turned off to absorb the energy. If the force absorbed by the trailer brakes is not taken into consideration, the engine autostop control circuit 110 would assume the vehicle brakes need to apply 60 kW of energy instead of 20 kW, which is this example, would result in the engine staying on.

Figure 3C:
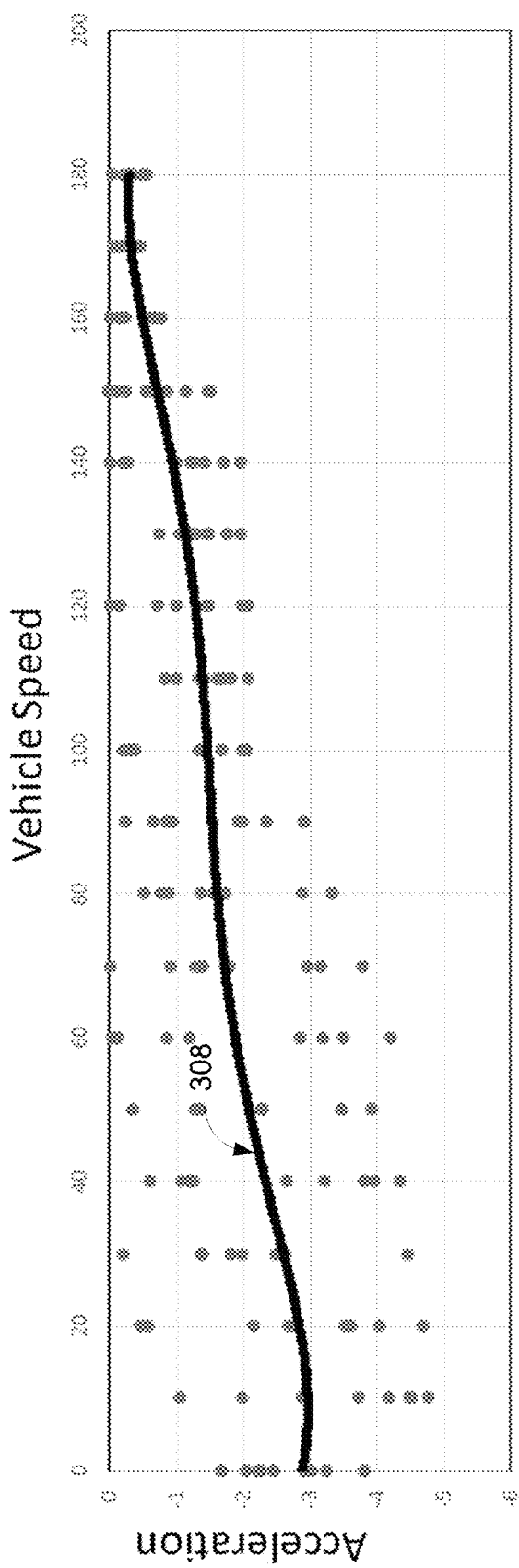
FIG. 3C is a graph illustrating an example of anticipated driver-braking deceleration.

Returning to FIG. 3A, at operation 304, the driver braking profile (described above) is generated and used to determine the anticipated deceleration at a given vehicle speed. As illustrated in FIG. 3C, driver behavior (in particular, braking events) can be monitored and recorded. The points shown in the graph of FIG. 3C reflect these data points. Driver behavior circuit 102 can be configured or adapted to record a determined number of braking points over some determined period of time so that a statistically relevant dataset can be achieved. An average deceleration can be determined based on the recorded data points to generate the driver braking profile so that a rate of deceleration at any given speed can be anticipated for that particular driver. The determination of average deceleration can be performed in accordance with various methods or schemes that are known to those of ordinary skill in the art.

Returning to FIG. 3A, at operation 306, the potential energy that can be recouped based on anticipated deceleration relative to the calculated mass and road load, and the force absorbed by the trailer brakes is calculated. From the anticipated average deceleration at a given speed, the average braking energy can be calculated, and the potential energy available to be recouped can be calculated as follows.

$$F_{motor} = \text{mass} * \text{acceleration}_{anticipated} - F_{road\ load} - F_{trailer\ brakes}$$

$$\text{Power}_{motor} = F_{motor} * \text{velocity}$$

Figure 3D:
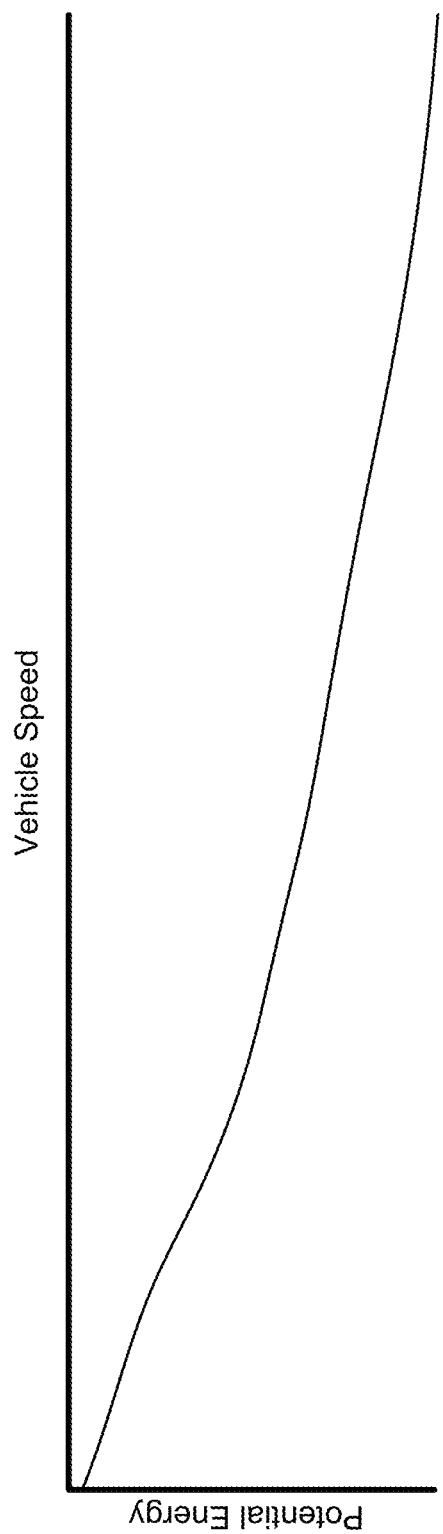
FIG. 3D is a graph illustrating example potential energy that can be recaptured through regenerative braking in view of the anticipated driver-braking deceleration profile and relationship between trailer brake force and vehicle brake pressure of FIGS. 3A and 3B.

FIG. 3D is a graph illustrating the potential energy that can be recouped relative to vehicle speed. Recalling the relationship between vehicle speed and deceleration power level (FIG. 2), this determination of potential energy can reflect an anticipated relationship based on actual vehicle and trailer mass/road load, trailer brake force, and driving characteristics. As will be described below, this can be considered relative to actual, current vehicle speed, requested brake operation/pressure, trailer brake gain, and power storage device power capacity (e.g., battery SOC) to determine the optimal point at which to stop engine 14.

Figure 4A:
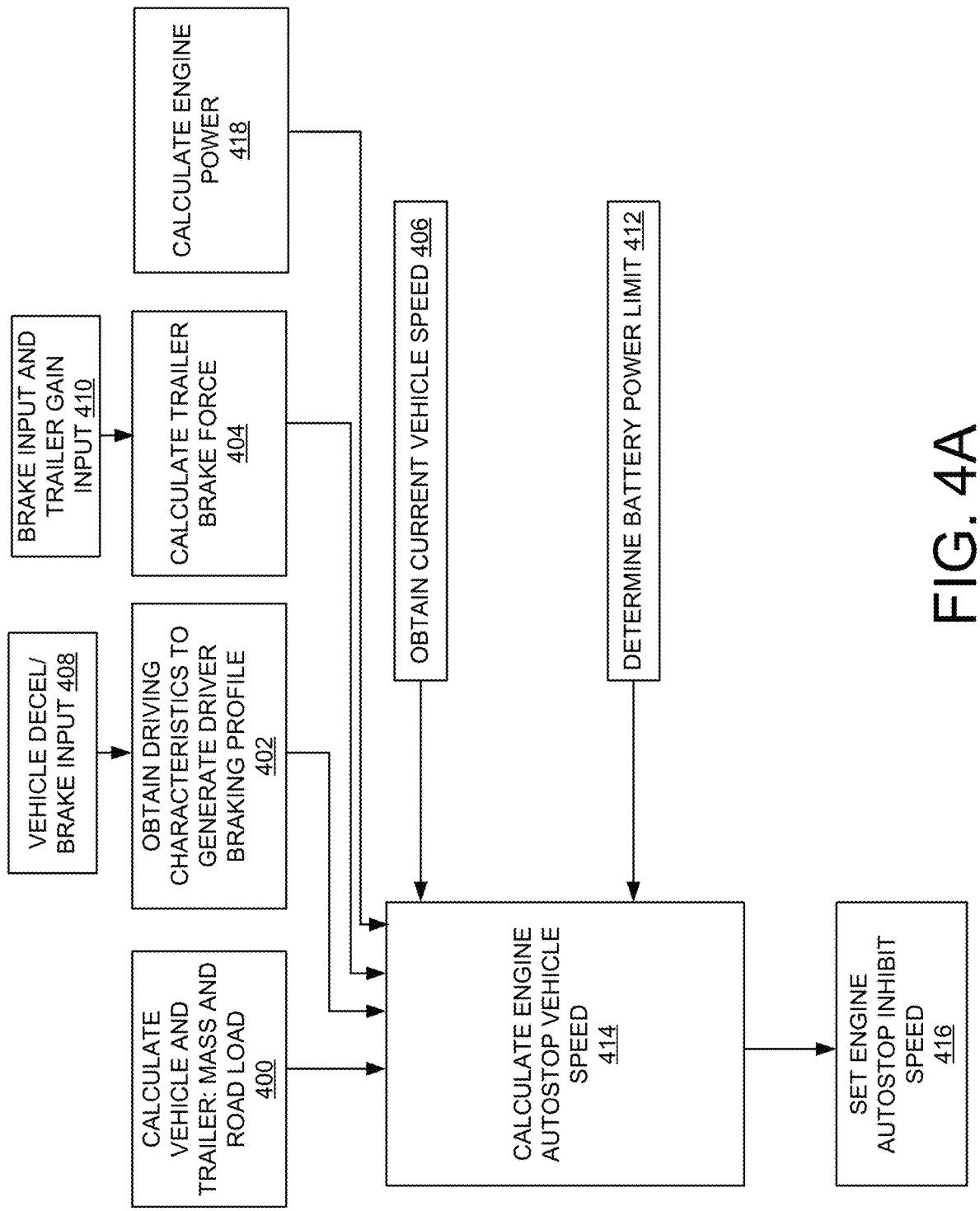
FIG. 4A is a flow chart illustrating example operations for determining a vehicle speed at which the engine should be stopped to maximize energy that can be recouped through regenerative braking and setting a vehicle speed at which engine autostop should be inhibited in accordance with one embodiment.

FIG. 4A is a flow chart illustrating example operations for determining a vehicle speed at which the engine should be stopped to maximize recouped energy, and setting a vehicle speed at which engine autostop should be inhibited in accordance with one embodiment. As described above in conjunction with FIGS. 3A-3D, vehicle and trailer mass and road load are calculated at operation 400, driver braking profile 402 is generated at operation 402, and trailer brake force is calculated at operation 404. This provides the relationship between vehicle speed and energy that can be recouped through regenerative braking. This relationship can be represented by the following equation.

$$\text{HybridPower}_{deceleration} = (A_{anticipated\_deceleration} * (M_{vehicle} + M_{trailer}) * V_{spd}) - P_{engine} - (F_{roadload} * V_{spd}) - (F_{vehicle\_brk} * V_{spd}) - (F_{trailer\_brk} * V_{spd})$$

Figure 4B:
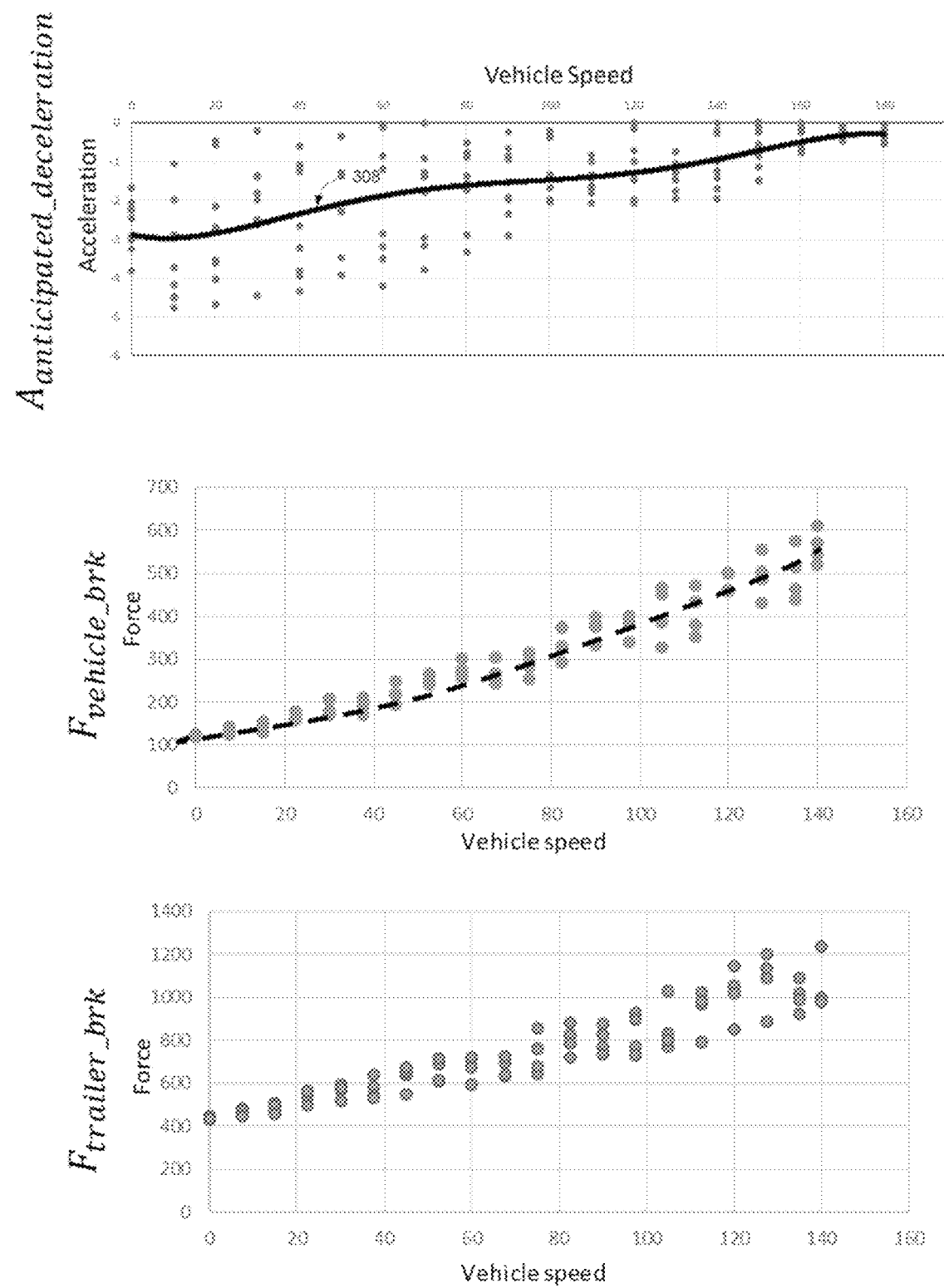
FIG. 4B illustrates example driver behavior graphs in accordance with one embodiment.
Figure 4C:
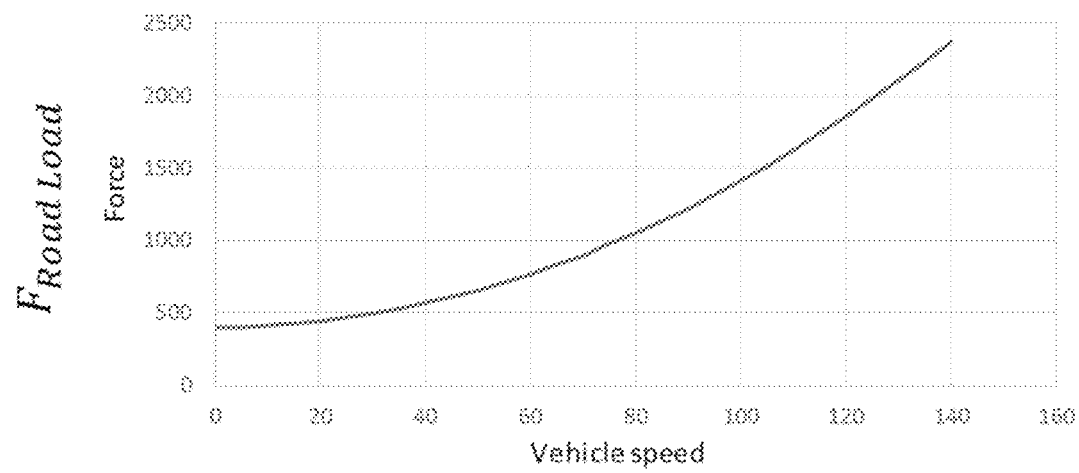
FIG. 4C illustrates an example road load force graph in accordance with one embodiment.
Figure 4D:
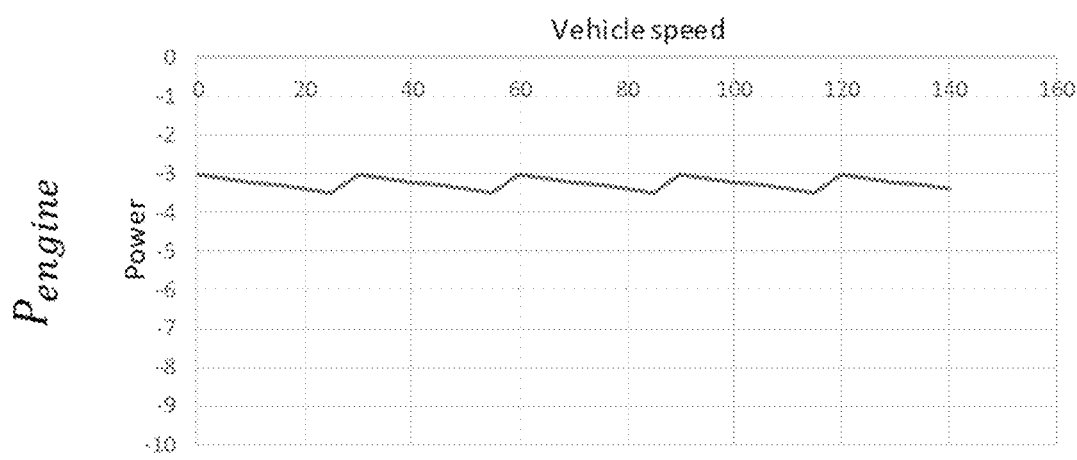
FIG. 4D illustrates an example engine power graph in accordance with one embodiment.

It should be understood that the force (acceleration/deceleration and mass), along with engine power, force due to road load, as well as the braking forces associated with the vehicle and trailer are all variable based on the speed of the vehicle. Force attributable for road load can be based on the physical characteristics of the vehicle and trailer (see FIG. 4C). Engine power can be based on the shift schedule of the vehicle (See FIG. 4D). Lookup tables can be used to store continuously varying driver input reflected in anticipated deceleration of the vehicle and the vehicle and trailer braking forces. Referring to FIG. 4B, graphical representations or maps of driver behavior are illustrated that include or impact anticipated deceleration, vehicle brake force, and trailer brake force as a function of vehicle speed. The braking input of the driver affects each of these behaviors. That is, during a brake-on deceleration event, the vehicle braking force (including regenerative braking) as well as the trailer braking force can be stored to create a map or graph showing vehicle/trailer braking force as a function of vehicle speed used to calculate the engine stop speed. As more braking events occur, a more accurate representation of driver behavior can be recorded.

At operation 406, current vehicle speed is obtained, e.g., from vehicle speed sensor 52B. At operation 408, vehicle deceleration and a vehicle brake request, i.e., the amount of braking power requested by a driver vis-à-vis depressing vehicle 10's brake pedal, is obtained. That is, the amount of potential energy that can be recouped depends on how aggressive the driver is braking, as this translates into the amount of deceleration power is available at the current vehicle speed.

At operation 410, vehicle brake input (from operation 408) and trailer brake gain is obtained based on the trailer brake force to vehicle brake pressure (determined above) at the current vehicle speed that vehicle 10 is traveling. At operation 412, the power storage device limit is determined. The power storage device (e.g., battery) limit can be a function of the power specification(s) or characteristics of the power storage device and the SOC of the power storage device. That is, as the SOC approaches a full condition, the charging limit fades to zero, i.e., the power storage device has less and less capacity to store power.

Figure 4E:
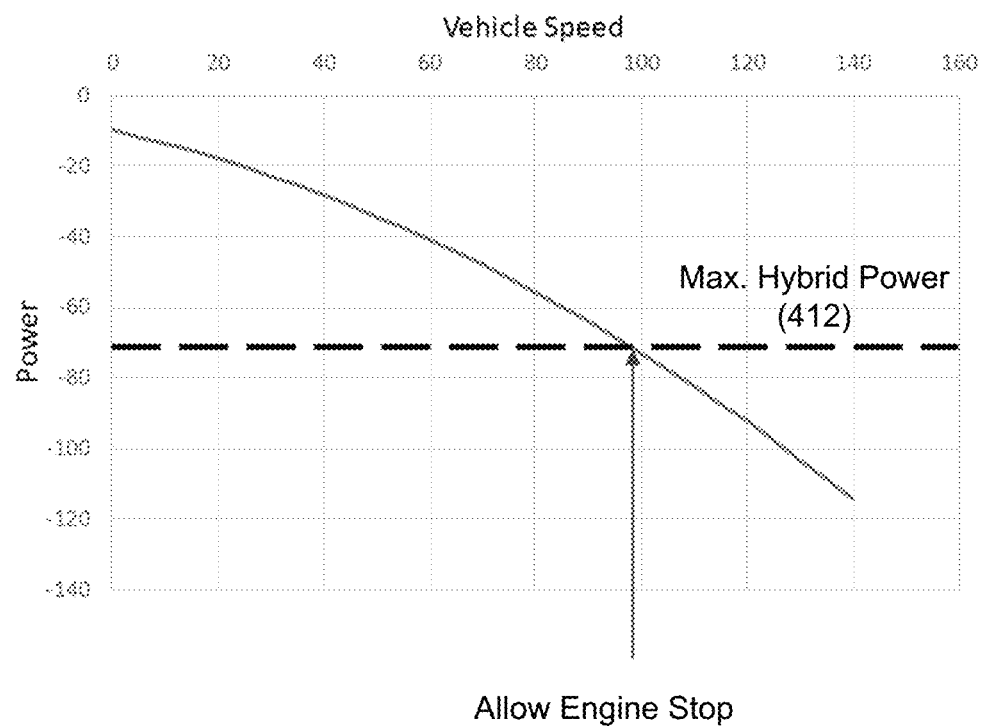
FIG. 4E illustrates an example graph of a calculated relationship between power needed to decelerate a vehicle in relation to vehicle speed and weight and regenerative braking potential in accordance with one embodiment.

By combining these different driver behavior inputs, the relationship between hybrid power deceleration and vehicle speed, a map can be created to reflect the amount of anticipated regenerative braking energy that is/would be available (See FIG. 4E). The illustrated intersection point is a point at which the engine stop feature may be allowed given a particular vehicle speed. It should be noted that at vehicle speeds lower than this, the engine may be stopped as well. However, past this point, the amount of energy that can be regenerated is not enough to warrant stopping the engine. It should also be noted that the maximum hybrid power available can be based on factors such as the power storage device SOC (412 of FIG. 4A), temperature of the power storage device, MG temperature, temperature of the inverter, etc.

At operation 414, the vehicle speed at which engine 14 should be stopped/engine autostop should be enabled is calculated. That is, the real-time vehicle operating conditions obtained in operations 406, 408, 410, and 412 are applied to the potential available energy determined based on the results of operations 400, 402, and 404.

Once the threshold vehicle speed at which engine 14 can be turned off, it can be used to set the engine autostop inhibit speed at operation 416. For example, returning to FIGS. 1A and 1B, engine autostop control circuit 110 may calculate the threshold vehicle speed. During operation of vehicle 10, engine autostop control circuit 110 may instruct or provide signals to electronic control unit 50 to shut off engine 14 at the threshold vehicle speed and under the other given conditions. For example, electronic control unit 50 can drive engine 14 in the engine-only and HEV travel modes. When the threshold vehicle speed is reached, electronic control unit 50 may output a control signal(s) to output control device 14A for stopping engine 14. Clutch 15 may be disengaged, and engine 14 is stopped. In the event engine autostop control circuit 110 determines that engine 14 should remain on, it may refrain from sending the control signal(s) to output control device 14A, allowing engine 14 to remain on.

In some embodiments, engine autostop control circuit 110 may be implemented as an add-on feature to a vehicle having existing engine autostop functionality. In this case, engine autostop control circuit 110 may control the existing engine autostop functionality by inhibiting the sending of the control signal(s) to output control device 14A, allowing engine 14 to remain on.

In order to recoup energy through regenerative braking, upon turning engine 14 off (when appropriate), engine autostop control circuit 110 can control actuation of MG 12 via the inverter 42. Specifically, electric energy is supplied from battery 44 to MG 12 via inverter 42. Engine autostop control circuit 110 can output a control signal(s) for driving MG 12 to rotate and generate positive or negative motor torque to obtain the output required of MG 12. For example, engine autostop control circuit 110 may output a control signal(s) to switch inverter 42 so that current is flowing to power storage device 44.

Figure 5:
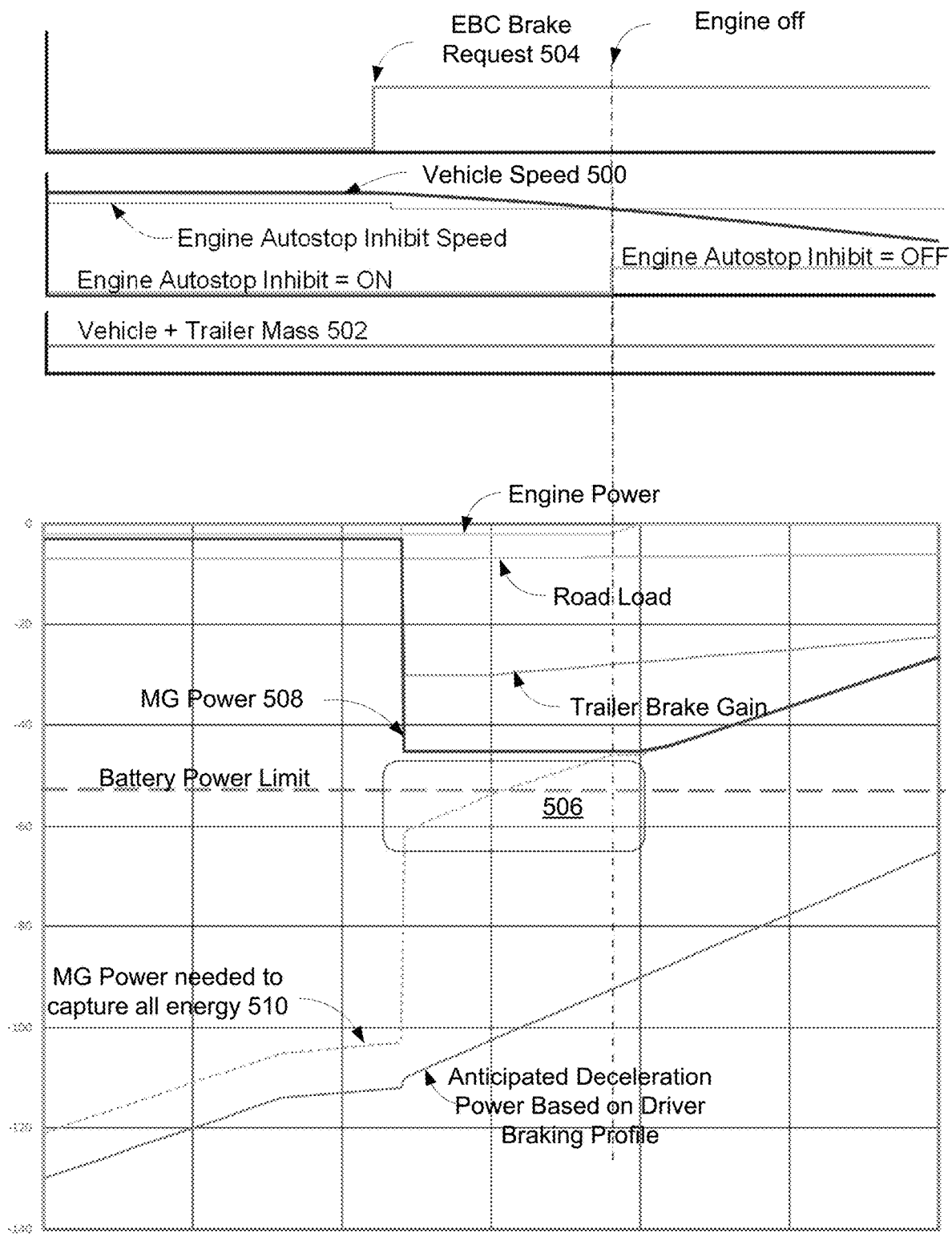
FIG. 5 is a time chart illustrating an example driving scenario during which engine autostop control can be applied in accordance with one embodiment.

FIG. 5 is a time chart illustrating an example driving scenario during which engine autostop control can be applied in accordance with one embodiment. FIG. 5 illustrates a scenario in which a vehicle, e.g., vehicle 10 is being driven at a particular vehicle speed 500. Based on the mass of vehicle 10 and the mass of the trailer being towed by vehicle 10 (vehicle+trailer mass 502), when the vehicle speed 500 is greater than the engine autostop inhibit speed (threshold vehicle speed at which the engine should be turned off), and the driver has not applied the brakes, engine 14 is instructed to remain on (i.e., it is in an engine autostop inhibit ON condition). When vehicle 10 receives an electronic braking controller (EBC) brake request 504, and vehicle 10 reaches a speed commensurate with the engine autostop inhibit speed, vehicle 10 can switch to an engine autostop inhibit OFF mode, and engine 14 is turned off.

FIG. 5 further illustrates the example relationships between engine power, road load, trailer brake gain, power storage device limit, and MG 12 power. It should be noted that other considerations can be taken into account regarding the operating conditions affecting the power storage device. For example, the temperature at which the power storage device is operating may have an impact on its ability to store and/or retain charge, e.g., a full charge SOC may not be realized if the operating temperature of the power storage device is relatively high or low. Moreover, FIG. 5 illustrates an example anticipated deceleration based on driver braking profile and available potential energy (MG 12 power needed to capture all energy). Here, the shaded area 506 in this example shows that the available potential energy is greater than the amount of energy MG 12 can capture based on the power capacity limit of power storage device 44 (in this case, a battery capacity limit). Accordingly, leaving engine 14 at this point, does not hurt or significantly impact fuel economy. However, at or near the point when MG 12 is capable of capturing all the available potential energy through regenerative braking, (when the MG Power line 508 meets and coincides with the MG Power needed to capture all energy line 510), engine 14 can be turned off, as the amount of energy that can be recouped is at its maximum. In this way, only when regenerative braking can be maximized is engine 14 turned off. Otherwise, engine 14 is left on to avoid delays/excessive energy consumption due to engine startup from an engine off condition.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 3. Various embodiments are described in terms of this example-computing component 300. After reading this description, it will become apparent to a person skilled in the relevant art how to implement the application using other computing components or architectures.

Figure 6:
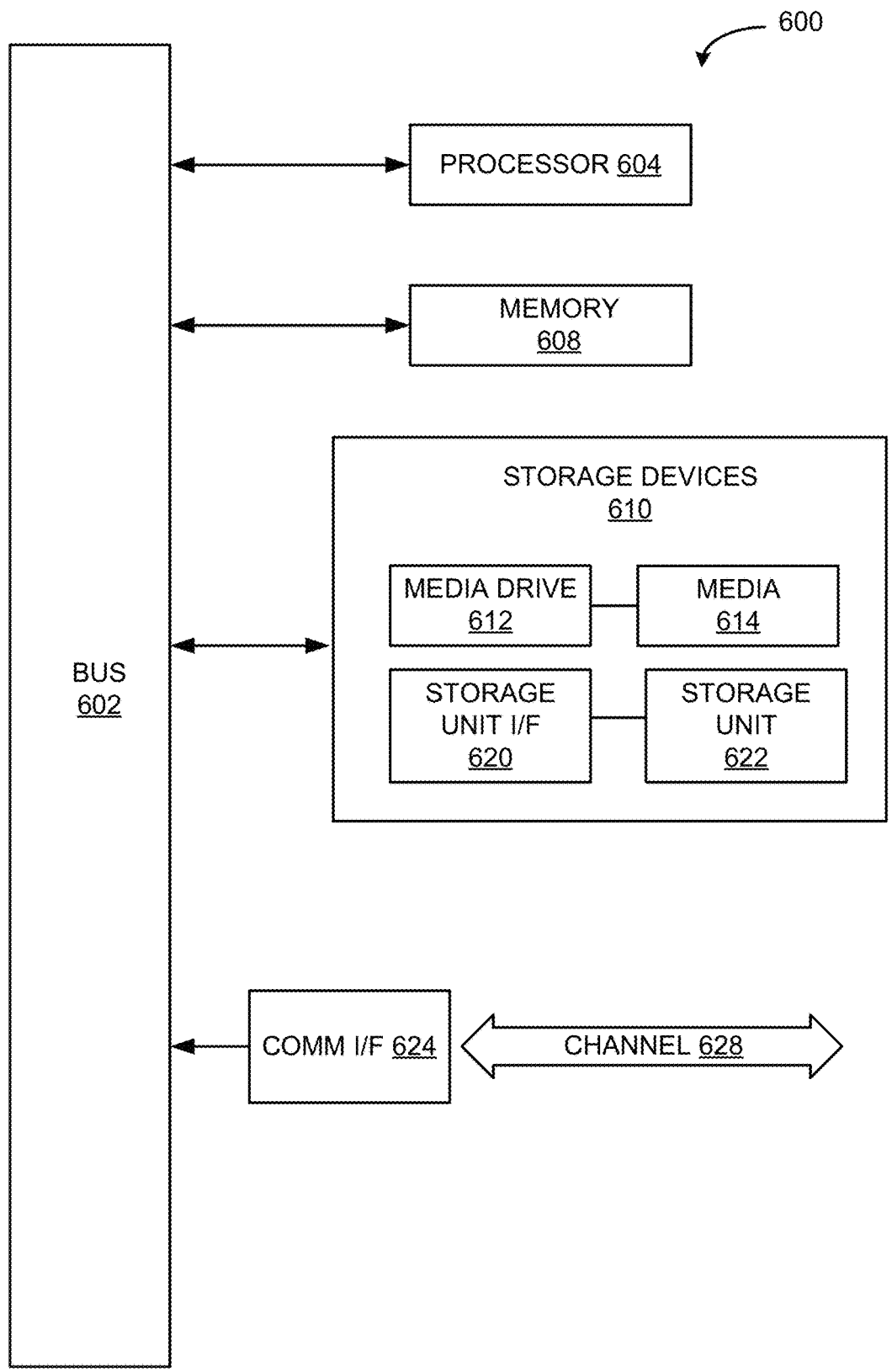
FIG. 6 is an example computing component that may be used to implement various features of embodiments described in the present disclosure.

Referring now to FIG. 6, computing component 600 may represent, for example, computing or processing capabilities found within computer processing units or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, electronic devices that might include some form of processing capability.

Computing component 600 might include, for example, one or more processors, controllers, control components, or other processing devices. This can include a processor, and/or any one or more of the components making up electronic control device 50 and/or its component parts, hydraulic control circuit 40, or other components or elements of vehicle, e.g., signal sensors, engine autostop circuit 110, etc. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of operating a hybrid electric vehicle towing a trailer, comprising:
   calculating mass and road load of the vehicle and the trailer being towed by the vehicle;
   calculating force absorbed by brakes of the trailer;
   generating a driver braking profile and determining anticipated deceleration given a vehicle speed based on the driver braking profile;
   calculating potential energy that can be recouped based on the anticipated deceleration relative to the calculated mass and road load of the vehicle and trailer and the force absorbed by the brakes of the trailer;
   determining an amount of regenerative braking available for the vehicle based on the calculated potential energy that can be recouped;
   determining a vehicle speed at which an engine of the vehicle should be stopped based on the amount of regenerative braking available;
   stopping an engine of the vehicle at the determined vehicle speed; and
   performing regenerative braking upon the vehicle reaching the vehicle speed at which the engine of the vehicle is to be stopped.

2. The method of claim 1, wherein the force absorbed by the brakes of the trailer is proportional to brake pressure applied by brakes of the vehicle.

3. The method of claim 1, wherein generating the driver braking profile comprises monitoring a driver's braking events over a period of time to determine rates of deceleration due to braking at a plurality of vehicle speeds.

4. The method of claim 3, wherein generating the driver braking profile further comprises determining an average rate of deceleration due to braking at each of the plurality of vehicle speeds.

5. The method of claim 1, further comprising determining a current speed at which the vehicle is traveling, determining a current requested brake force, determining a trailer brake gain based on the force absorbed by the brakes of the trailer, and determining a remaining capacity of a power storage device of the vehicle.

6. The method of claim 5, further comprising comparing the current speed at which the vehicle is traveling, the current requested brake force compensated by the trailer brake gain, and the remaining capacity of the power storage device of the vehicle to the anticipated deceleration and potential energy that can be recouped based on the anticipated deceleration.

7. A hybrid electric vehicle towing a trailer, comprising:
   an internal combustion engine;
   an electric motor operatively connected in parallel to the internal combustion engine; and
   an electronic control unit adapted to control operation of the internal combustion engine in accordance with one or more control signals from an engine autostop control circuit instructing the electronic control unit to turn the internal combustion engine off upon the hybrid electric vehicle reaching a threshold vehicle speed at which the electric motor can recoup all available energy through regenerative braking and the hybrid electric vehicle is decelerating.

8. The hybrid electric vehicle of claim 7, wherein the electronic control unit is adapted to further control operation of the internal combustion engine in accordance with additional one or more control signals from the engine autostop control circuit instructing the electronic control unit to keep the internal combustion engine on when the hybrid electric vehicle is traveling at a speed that surpasses the threshold vehicle speed.

9. The hybrid electric vehicle of claim 7, wherein the engine autostop control circuit calculates potential available energy that can be recouped through regenerative braking.

10. The hybrid electric vehicle of claim 9, wherein the engine autostop control circuit calculates the potential available energy that can be recouped based on force absorbed by brakes of the trailer during deceleration of the hybrid electric vehicle.

11. The hybrid electric vehicle of claim 10, wherein the engine autostop control circuit calculates the potential available energy that can be recouped based additionally on mass and road load of the hybrid electric vehicle and the trailer.

12. The hybrid electric vehicle of claim 11, wherein the engine autostop control circuit calculates the potential available energy that can be recouped based additionally on an anticipated deceleration due to braking by a driver of the hybrid electric vehicle.

13. A method comprising:
   calculating mass and road load of a vehicle and trailer being towed by the vehicle;
   calculating force absorbed by brakes of the trailer;
   generating a driver braking profile and determining anticipated deceleration given a vehicle speed based on the driver braking profile;
   calculating potential energy that can be recouped based on the anticipated deceleration relative to the calculated mass and road load of the vehicle and trailer and the force absorbed by the brakes of the trailer;
   determining a current speed at which the vehicle is traveling, determining a current requested brake force, determining a trailer brake gain based on the force absorbed by the brakes of the trailer, and determining a remaining capacity of a power storage device of the vehicle;
   comparing the current speed at which the vehicle is traveling, the current requested brake force compensated by the trailer brake gain, and the remaining capacity of the power storage device of the vehicle to the anticipated deceleration and potential energy that can be recouped based on the anticipated deceleration;
   determining a vehicle speed at which an engine of the vehicle is to be stopped; and
   performing regenerative braking upon the vehicle reaching the vehicle speed at which the engine of the vehicle is to be stopped.

14. The method of claim 13, wherein the force absorbed by the brakes of the trailer is proportional to brake pressure applied by brakes of the vehicle.

15. The method of claim 13, wherein generating the driver braking profile comprises monitoring a driver's braking events over a period of time to determine rates of deceleration due to braking at a plurality of vehicle speeds.

16. The method of claim 15, wherein generating the driver braking profile further comprises determining an average rate of deceleration due to braking at each of the plurality of vehicle speeds.

17. The method of claim 13, further comprising determining a current speed at which the vehicle is traveling, determining a current requested brake force, determining a trailer brake gain based on the force absorbed by the brakes of the trailer, and determining a remaining capacity of a power storage device of the vehicle.

18. The method of claim 17, further comprising comparing the current speed at which the vehicle is traveling, the current requested brake force compensated by the trailer brake gain, and the remaining capacity of the power storage device of the vehicle to the anticipated deceleration and potential energy that can be recouped based on the anticipated deceleration.

* * * * *